US011623623B2

(12) United States Patent
Yokoyama

(10) Patent No.: US 11,623,623 B2
(45) Date of Patent: Apr. 11, 2023

(54) STROKE SIMULATOR AND BRAKE OPERATING DEVICE INCLUDING THE STROKE SIMULATOR

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/211,063

(22) Filed: Mar. 24, 2021

(65) Prior Publication Data

US 2021/0323520 A1 Oct. 21, 2021

(30) Foreign Application Priority Data

Apr. 21, 2020 (JP) .............................. JP2020-075431

(51) Int. Cl.
*B60T 8/40* (2006.01)
*B60T 7/06* (2006.01)
*F16F 13/00* (2006.01)
*F16F 13/06* (2006.01)
*G05G 5/03* (2008.04)

(52) U.S. Cl.
CPC ............ *B60T 8/409* (2013.01); *B60T 8/4086* (2013.01); *F16F 13/007* (2013.01); *F16F 13/06* (2013.01); *G05G 5/03* (2013.01); *B60T 7/06* (2013.01); *F16F 2232/08* (2013.01); *F16F 2234/02* (2013.01); *F16F 2236/04* (2013.01)

(58) Field of Classification Search
CPC ...... B60T 8/409; B60T 8/4081; B60T 8/4086; G05G 5/03
See application file for complete search history.

(56) References Cited

U.S. PATENT DOCUMENTS

| 4,166,655 | A | * | 9/1979 | Spero ........................ B60T 8/00 138/30 |
| 7,331,641 | B2 | * | 2/2008 | Kusano .................. B60T 13/74 303/114.1 |
| 9,139,168 | B2 | * | 9/2015 | Jeon .......................... B60T 7/04 |
| 10,836,368 | B2 | * | 11/2020 | Kim .......................... B60T 7/04 |
| 2003/0205932 | A1 | | 11/2003 | Anderson |
| 2005/0082909 | A1 | * | 4/2005 | Constantakis ........ B60T 8/3255 303/20 |

(Continued)

FOREIGN PATENT DOCUMENTS

| DE | 102017104278 A1 | * | 9/2018 | ............. B60K 23/02 |
| DE | 102017113625 A1 | * | 12/2018 | |

(Continued)

*Primary Examiner* — Thomas J Williams
(74) *Attorney, Agent, or Firm* — Sughrue Mion, PLLC

(57) ABSTRACT

A stoke simulator operable by an operation of a brake operation member that is operated by a driver, including: a housing: a movable member held by the housing so as to be movable relative to the housing, the movable member being connected to the brake operation member; a volume change chamber disposed forward of the movable member in the housing; and a plurality of elastic members disposed in the volume change chamber and capable of generating an elastic force in accordance with a movement of the movable member, at least one of the plurality of elastic members being a rubber-like member.

4 Claims, 6 Drawing Sheets

(56) References Cited

U.S. PATENT DOCUMENTS

| | | | | |
|---|---|---|---|---|
| 2013/0233118 A1* | 9/2013 | Khan | ................. | B60T 7/042 |
| | | | | 74/514 |
| 2016/0264113 A1* | 9/2016 | Feigel | ................. | B60T 8/4086 |
| 2018/0334148 A1* | 11/2018 | Feigel | ................. | B60T 7/042 |
| 2019/0061720 A1* | 2/2019 | Kunz | ................. | B60T 8/4086 |
| 2019/0308601 A1* | 10/2019 | Maj | ................. | B60T 7/042 |
| 2021/0323520 A1* | 10/2021 | Yokoyama | ............ | B60T 8/409 |
| 2021/0339724 A1 | 11/2021 | Maruo et al. | | |

FOREIGN PATENT DOCUMENTS

| | | | | |
|---|---|---|---|---|
| DE | 102019101646 A1 * | 7/2020 | ............ | B60K 26/02 |
| DE | 112018006276 T5 * | 8/2020 | ............ | B60T 11/20 |
| JP | 11-115724 A | 4/1999 | | |
| JP | 2004-026134 A | 1/2004 | | |
| JP | 2006-256408 A | 9/2006 | | |
| JP | 2020-044925 A | 3/2020 | | |
| WO | WO-2020059325 A1 * | 3/2020 | ............ | B60T 13/142 |

\* cited by examiner

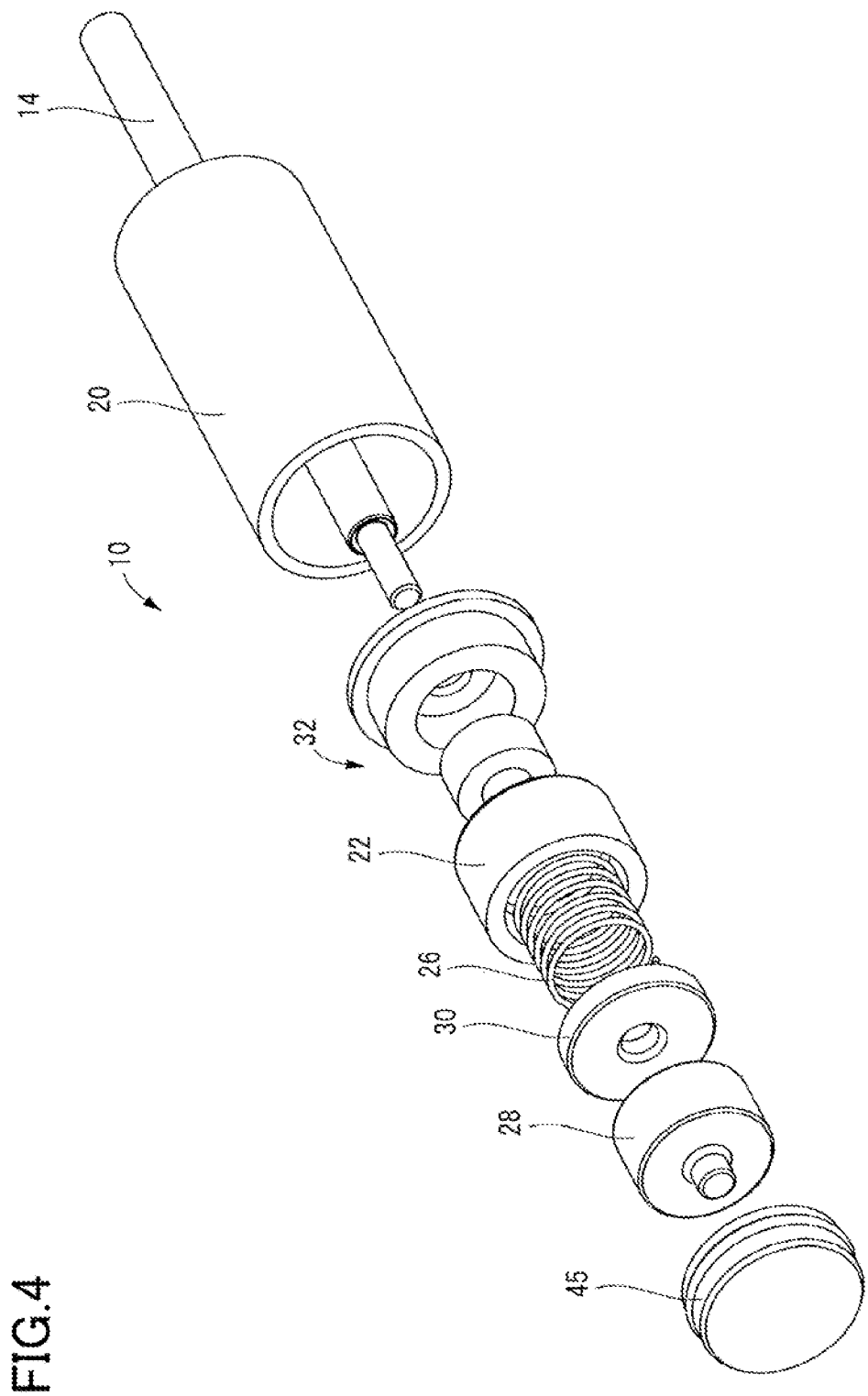

STROKE SIMULATOR AND BRAKE OPERATING DEVICE INCLUDING THE STROKE SIMULATOR

CROSS REFERENCE TO RELATED APPLICATION

The present application claims priority to Japanese Patent Application No. 2020-075431, which was filed on Apr. 21, 2020, the disclosure of which is herein incorporated by reference in its entirety.

BACKGROUND

Technical Field

The following disclosure relates to a stroke simulator configured to apply a reaction force to a brake operating member in accordance with an operation of the brake operating member and also relates to a brake operating device including the brake operating member.

Description of Related Art

A stroke simulator described in Patent Document 1 (Japanese Patent Application Publication No. 11-115724) is configured to be operated by a movement of an operation rod (hereinafter simply referred to as "rod" where appropriate) connected to a brake operating member operated by a driver. The stroke simulator includes a movable member connected to the rod, a volume change chamber whose volume changes in accordance with a movement of the movable member, and a coil spring disposed in the volume change chamber. A working fluid is stored in the volume change chamber, and an electromagnetic valve is connected to the volume change chamber. By controlling the electromagnetic valve, a relationship between a stroke of the brake operating member and a reaction force applied to the brake operating member is adjusted.

SUMMARY

An aspect of the present disclosure is directed to an improvement in a stroke simulator and is directed to, for example, a stroke simulator that allows an easy increase in a brake operation force at the time of bottoming of a brake operating member.

A stroke simulator according to the present disclosure is operable by a movement of the rod connected to the brake operating member that is operated by a driver. The stroke simulator includes at least one elastic member capable of generating an elastic force in accordance with a movement of the movable member connected to the rod, and one or more of the least one elastic member are rubber-like members. The stroke simulator applies, to the brake operating member, a reaction force based on elastic deformation of the rubber-like member caused by the movement of the rod. The stiffness (the spring constant) of the rubber-like member is in general larger than the spring constant of the coil spring. Further, the stiffness of the rubber-like member can be made large more easily than the stiffness of the coil spring. Thus, the present stroke simulator including at least one rubber-like member allows an increase in the brake operation force at the time of bottoming more easily than a stroke simulator not including the rubber-like member as the elastic member but including the coil spring. The brake operation force is an operation force applied to the brake operating member.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 4 is an exploded perspective view of the stroke simulator;

DETAILED DESCRIPTION OF THE EMBODIMENT

Figure 1:
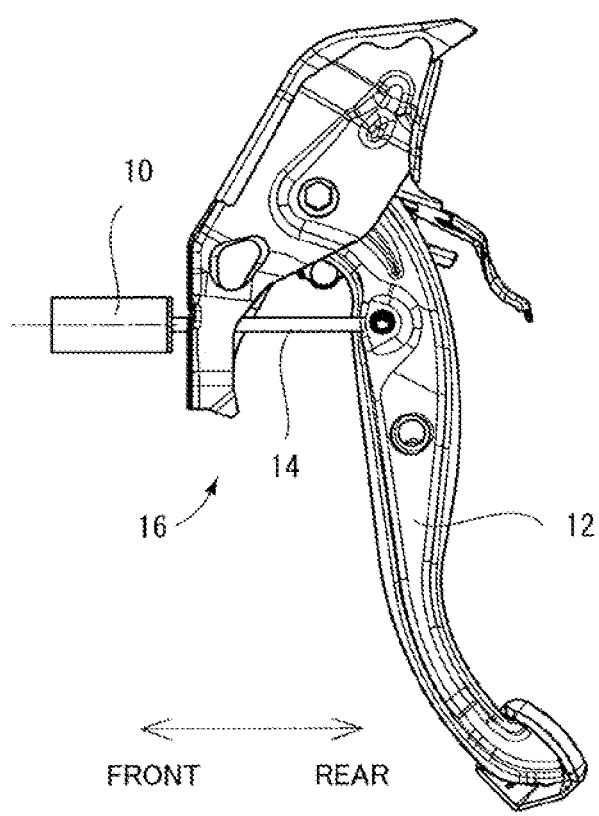
FIG. 1 is a view of a brake operating device according to one embodiment of the present disclosure, the brake operating device including a stroke simulator according to one embodiment of the present disclosure.

Referring to the drawings, there will be explained in detail a stroke simulator for a vehicle according to one embodiment of the present disclosure. The present stroke simulator is applicable to a hydraulic brake system of a by-wire type, an electric brake system including an electric brake, and the like. The stroke simulator is a constituent element of a brake operating device according to one embodiment of the present disclosure.

As illustrated in FIG. 1, the present stroke simulator denoted as 10 is operated in accordance with a movement of an operation rod (hereinafter simply referred to as "rod" where appropriate) 14 connected to a brake pedal 12 as a brake operating member. The stroke simulator 10 applies, to the brake pedal 12, a reaction force in accordance with the movement of the rod 14. The reaction force corresponds to a brake operation force that is an operation force applied to the brake pedal 12. In the present embodiment, the brake pedal 12 and the stroke simulator 10 constitute a brake operating device 16.

There are known wet-type stroke simulators and dry-type stroke simulators. The wet-type stroke simulator is configured such that a working fluid is supplied to a main body of the stroke simulator so as to move a movable member. The wet-type stroke simulator is disposed downstream of a master cylinder, for example. The dry-type stroke simulator is configured such that the movable member is moved without supplying the working fluid to the main body of the stroke simulator. The dry-type stroke simulator is provided so as to be connected to the brake operating member, for example.

Figure 2:
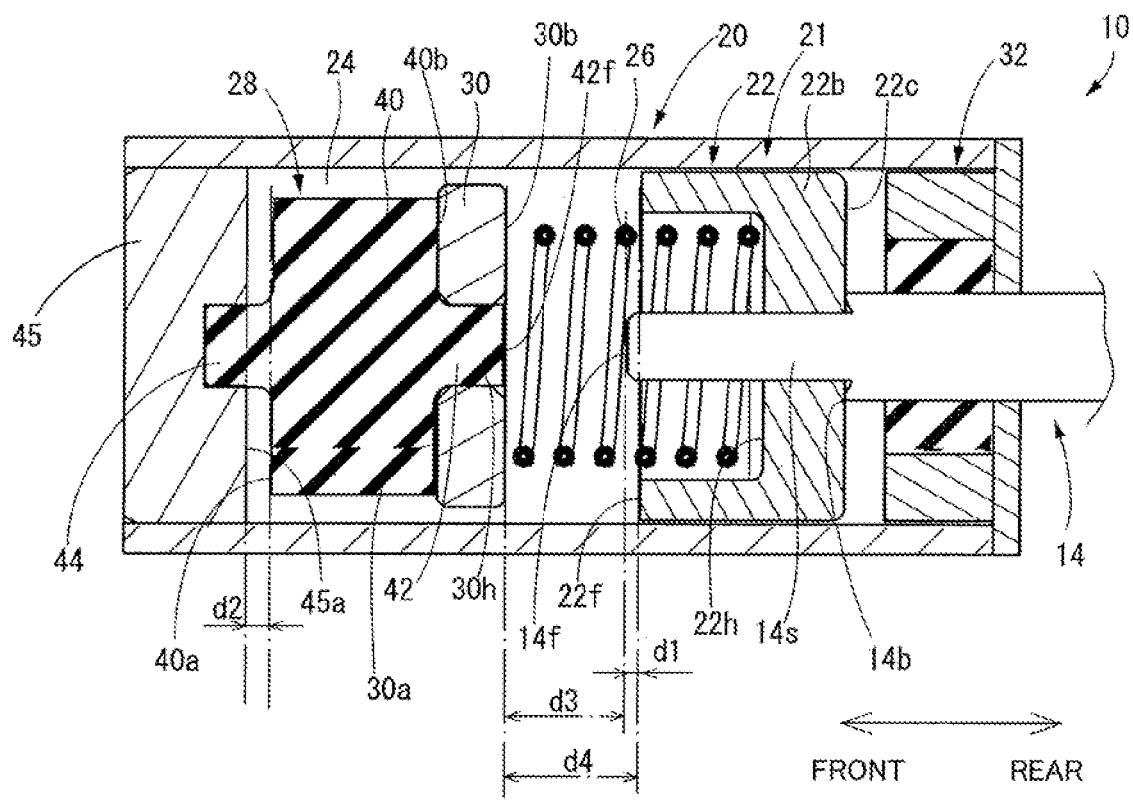
FIG. 2 is a cross-sectional view of the stroke simulator.
Figure 3:
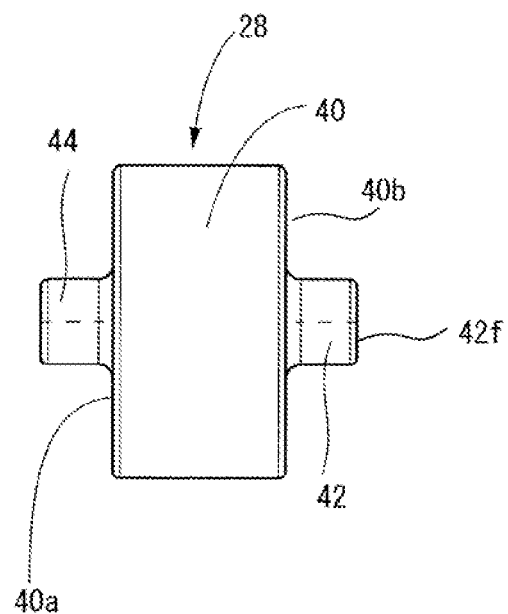
FIG. 3 is a front view of a rubber member as a constituent element of the stroke simulator.

The stroke simulator 10 according to the present disclosure is of the dry type. As illustrated in FIGS. 2-4, the stroke simulator 10 includes a housing 20, a movable member 21 movably fitted in the housing 20, a volume change chamber 24 disposed forward of the movable member 21, and a coil spring 26 and a rubber member 28, as a plurality of elastic members, disposed in series in the volume change chamber 24. The rubber member 28 is one example of a rubber-like member. The working fluid may or may not be stored in the volume change chamber 24.

The housing 20 is a cylindrical member and is held by a body of the vehicle (not illustrated) such that the housing 20 takes a posture in which the axial direction thereof coincides with a front-rear direction of the vehicle.

The movable member 21 is connected to the rod 14. In the present embodiment, the movable member 21 includes a small-diameter portion 14*s* and a piston 22 as a large-diameter portion. The piston 22 has a generally cylindrical shape. The piston 22 is disposed in a posture in which an opening portion thereof is located more forward than a bottom portion thereof in the front-rear direction of the vehicle. The rod 14 extends forward so as to penetrate a cap 32 of the housing 20 and a central portion of a bottom portion 22*b* of the piston 22. A front portion of the rod 14 functions as the small-diameter portion 14*s* having a smaller diameter than an axially intermediate portion of the rod 14. The small-diameter portion 14*s* penetrates the central portion of the bottom portion 22*b* of the piston 22, and a stepped portion 14*b* of the rod 14 is in contact with an outer face 22*c* of the bottom portion 22*b* of the piston 22. The outer face 22*c* is also referred to as a rear end face 22*c* of the piston 22. Thus, the piston 22 and the rod 14 are connected so as to be advanceable together. A front end face 14*f* of the small-diameter portion 14*s* is located more forward than an annular front end face 22*f* at the opening portion of the piston 22, by a distance d1.

The coil spring 26 and the rubber member 28 are disposed in series along the longitudinal direction of the housing 20. The rubber member 28 is located forward of the coil spring 26.

As illustrated in FIG. 3, the rubber member 28 has a stepped cylindrical shape. Specifically, the rubber member 28 includes a large-diameter main body 40 and small-diameter protruding portions 42, 44 respectively provided at central portions of opposite end faces 40*b*, 40*a* (that will be explained) of the main body 40. A connected portion between the main body 40 and each protruding portion 42, 44 is rounded, so that the main body 40 and each protruding portion 42, 44 are smoothly connected. In the present embodiment, the protruding portion 42 is a rear-side protruding portion, and the protruding portion 44 is a front-side protruding portion.

The rubber member 28 is held at the protruding portion 44 thereof by a bottom portion 45 of the housing 20. When the movable member 21 is located at its retracted (rearward) end position, a space (corresponding to a distance d2) is present between a front end face 40*a* of the main body 40 and a rear end face 45*a* of the bottom portion 45 of the housing 20.

A washer 30 is a plate member having a generally annular shape. The washer 30 is attached to the rubber member 28 without a space interposed therebetween in a state in which the protruding portion 42 is fitted in a central hole 30*h* of the washer 30. That is, the washer 30 is attached to the rubber member 28 such that no space exists between a front end face 30*a* of the washer 30 and a rear end face 40*b* of the main body 40. In the present embodiment, a rear end face 30*b* of the washer 30 and a rear end face 42*f* of the protruding portion 42 are located at substantially the same position in the front-rear direction (the longitudinal direction). The coil spring 26 is disposed between an inner bottom surface 22*h* of the piston 22 and the rear end face 30*b* of the washer 30.

In the stroke simulator 10 constructed as described above, when the brake pedal 12 is located at its retracted (rearward) end position and the movable member 21 is located at its retracted end position, a distance d3 between the front end face 14*f* of the small-diameter portion 14*s* and the rear end face 42*f* of the protruding portion 42 of the rubber member 28 is smaller than a distance d4 between the front end face 22*f* of the piston 22 and the rear end face 30*b* of the washer 30 (d3<d4).

When the brake pedal 12 is depressed, the rod 14 is advanced so that the movable member 21 is advanced. The advancing movement causes elastic deformation of at least one of the coil spring 26 and the rubber member 28, so that an elastic force based on the elastic deformation is applied as a reaction force to the brake pedal 12.

There will be hereinafter explained in detail an operation of the stroke simulator 10.

Figure 5A:
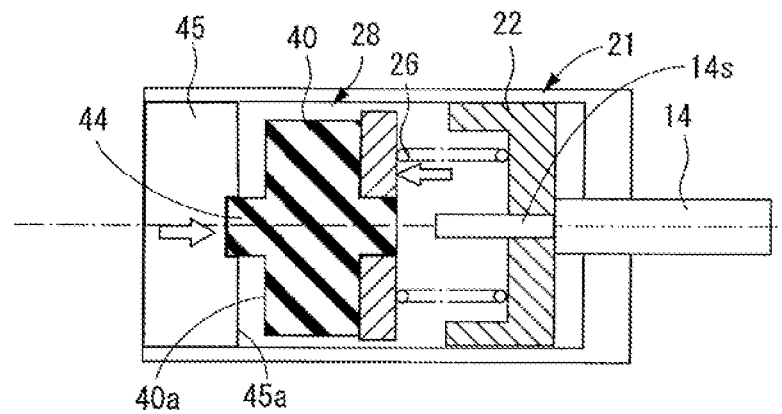
FIG. 5A is a view conceptually illustrating an operation of the stroke simulator in a state in which a brake operation force is not larger than a first set value.

When the brake pedal 12 is operated by an operation force F that is smaller than or equal to a first set value FA (F≤FA) as illustrated in FIG. 5A, the brake operation force F acts on the coil spring 26 via the piston 22, and an elastic force of the coil spring 26 acts on the rubber member 28 via the washer 30. The coil spring 26 is elastically deformed, and the rubber member 28 is elastically deformed. In the present stroke simulator, the coil spring 26 and the rubber member 28 are disposed in series. Thus, a spring constant K(A) of the stroke simulator as a whole is represented by the following equation:

$$1/K(A)=1/ks+1/ka \qquad (1)$$

wherein ks represents a spring constant (N/mm) of the coil spring 26 and ka represents a spring constant (stiffness) of the rubber member 28 when the elastic force of the coil spring 26 acts on the main body 40 of the rubber member 28.

The front end face 40*a* of the main body 40 is spaced apart from the rear end face 45*a* of the bottom portion 45 of the housing 20. Thus, the rubber member 28 is relatively easily elastically deformed, and the spring constant ka is relatively small.

A relationship between the brake operation force and the stroke (hereinafter referred to as "feeling characteristics" where appropriate) in the state of FIG. 5A corresponds to a region A of a line M in FIG. 6.

Figure 5B:
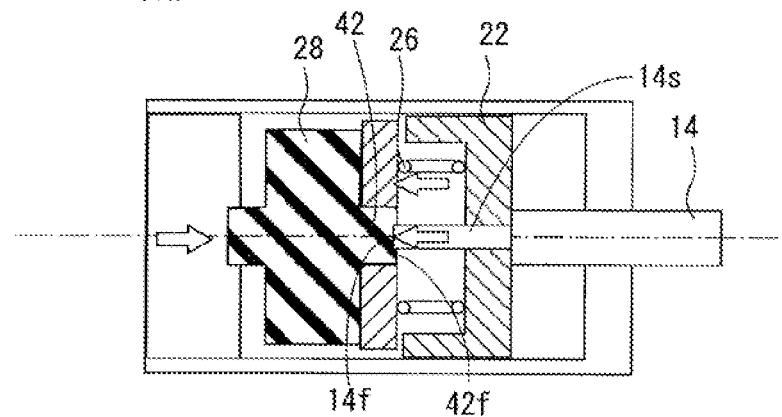
FIG. 5B is a view conceptually illustrating an operation of the stroke simulator in a state in which the brake operation force is larger than the first set value and not larger than a second set value.

When the brake pedal 12 is operated by the operation force F that is larger than the first set value FA and not larger than a second set value FB (FA<F≤FB) as illustrated in FIG. 5B, the brake operation force F acts on the coil spring 26 via the piston 22 and also acts on the rubber member 28 via the small-diameter portion 14*s*. Further, the elastic force of the coil spring 26 acts on the rubber member 28. In the rubber member 28, the protruding portion 44, which is located opposite to the protruding portion 42 with respect to the main body 40, is supported by the bottom portion 45 of the housing 20. Accordingly, the rubber member 28 is less likely to be elastically deformed by a ore applied via the small-diameter portion 14s. The spring constant (stiffness) kb of the rubber member 28 in this state is larger than the spring constant ka illustrated in FIG. 5A. The spring constant K(B) of the stroke simulator as a whole is represented by the following equation (2). The feeling characteristics in the state of FIG. 5B correspond to a region B of the line M in FIG. 6.

$$1/K(B)=1/ks+1/kb \qquad (2)$$

By transforming and rearranging the above equations (1) and (2), it is found that the spring constant K(B) is larger than the spring constant K(A), i.e., K(B)>K(A).

Figure 6:
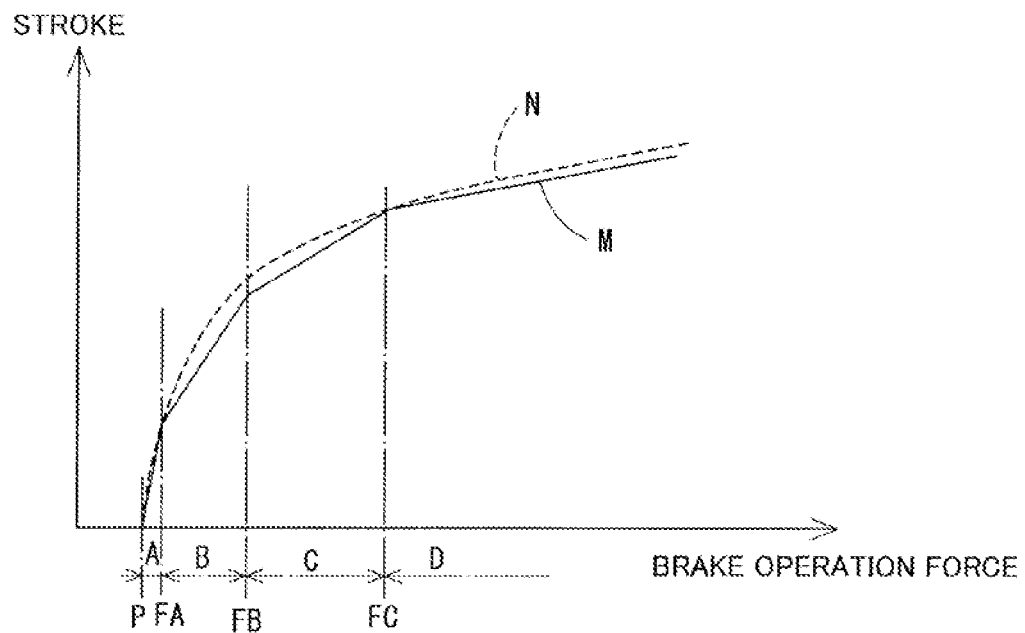
FIG. 6 is a graph conceptually illustrating a relationship between a stroke and the brake operation force in the stroke simulator.

This is apparent from a change in the inclination of the line M in the regions A, B in FIG. 6. It is noted that the change in the inclination of the line M illustrated in FIG. 6 is larger than an actual change for clearly indicating the change in the spring constant.

Figure 5C:
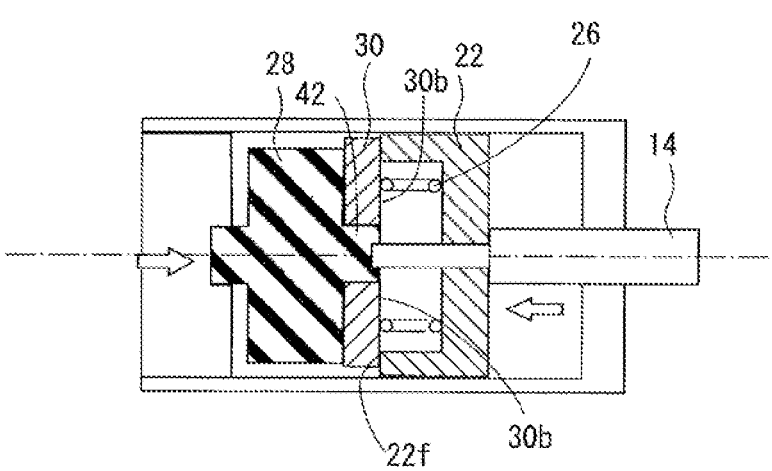
FIG. 5C is a view conceptually illustrating an operation of the stroke simulator in a state in which the brake operation force is larger than the second set value and not larger than a third set value.

When the brake pedal 12 is operated by the operation force F that is larger than the second set value FB and not larger than a third set value FC(FB<F≤FC) as illustrated in FIG. 5C, the front end face 22f of the piston 22 comes into contact with the washer 30. The washer 30 is a rigid member, and the piston 22 is moved integrally with the washer 30. The brake operation force F acts on the rubber member 28 via the small-diameter portion 14s and the piston 22. The coil spring 26 is held in a state in which the coil spring 26 is elastically deformed between the inner bottom surface 22h of the piston 22 and the rear end face 30b of the washer 30, and the length of the coil spring 26 is kept constant. Accordingly, the spring constant K(C) of the stroke simulator as a whole in this state is determined by the spring constant kc of the rubber member 28. The feeling characteristics in the state of FIG. 5C correspond to a region C of the line M in FIG. 6.

$$K(C)=kc \qquad (3)$$

It is considered that the spring constant kc of the rubber member 28 is substantially the same as the spring constant kb. Thus, by transforming and rearranging the equations (2) and (3), it is found that the spring constant K(C) is larger than the spring constant K(B), i.e., K(C)>K(B).

This is apparent from a change in the inclination of the line M in the regions B, C in FIG. 6.

Figure 5D:
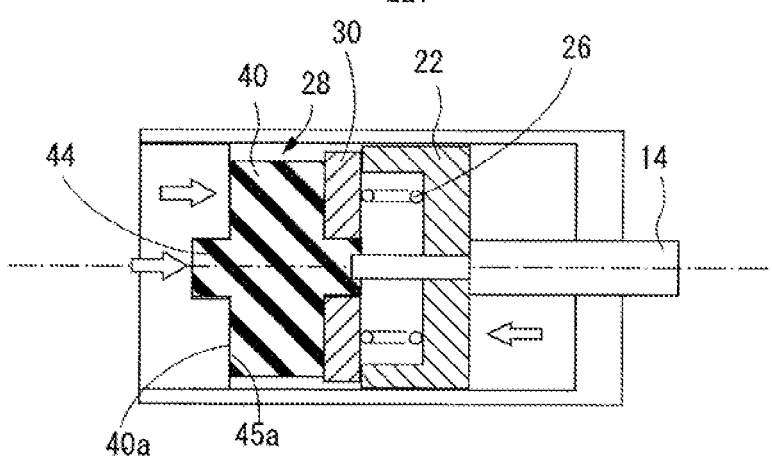
FIG. 5D is a view conceptually illustrating an operation of the stroke simulator in a state in which the brake operation force is larger than the third set value.

When the brake pedal 12 is operated by the operation force F that is larger than the third set value FC (F>FC) as illustrated in FIG. 5D, the spring constant K(D) of the stroke simulator as a whole is determined by the spring constant kd of the rubber member 28, as in FIG. 5C. The feeling characteristics in the state of FIG. 5D correspond to a region D of the line M in FIG. 6.

$$K(D)=kd \qquad (4)$$

The front end face 40a of the main body 40 of the rubber member 28 comes into contact with and is supported by the rear end face 45a of the bottom portion 45 of the housing 20. Thus, the rubber member 28 is less likely to be elastically deformed, as compared with the state of FIG. 5C, and the spring constant kd is larger than the spring constant kc. Accordingly, the spring constant K(D) of the stroke simulator is larger than the spring constant K(C). This is apparent from the change in the inclination of the line M in the regions C, D in FIG. 6.

As explained above, the first set value FA represents a magnitude of the brake operation force when the front end face 14f of the rod 14 comes into contact with the rear end face 42f of the protruding portion 42 of the rubber member 28. The second set value FB represents a magnitude of the brake operation force when the front end face 22f of the piston 22 comes into contact with the rear end face 30b of the washer 30. The third set value FC represents a magnitude of the brake operation force when the front end face 40a of the main body 40 of the rubber member 28 comes into contact with the rear end face 45a of the bottom portion 45. The first set value FA is smaller than the second set value FB, and the second set value FR is smaller than the third set value FC (FA<FB<FC).

It is noted that the spring constant of the stroke simulator 10 can be obtained in consideration of spring constants of the housing 20 and the bottom portion 45, for example.

The stroke simulator 10 according to the present embodiment includes the rubber member 28 as the elastic member, making it possible to easily increase the brake operation force at the time of bottoming of the brake pedal 12.

The rubber member is in general less expensive than the coil spring. The stroke simulator 10 that employs the rubber member 28 in place of the coil spring is produced at a low cost.

The rubber member 28 having the stepped shape enables the spring constant of the stroke simulator 10 to be switched in a plurality of steps. The spring constant can be switched in a plurality of steps by changing the contact state of the rubber member 28 and the housing 20. For switching the spring constant in a stroke simulator not including the rubber member but including a coil spring, for example, the stroke simulator needs to have a plurality of coil springs. In contrast, the present stroke simulator that includes the rubber member 28 enables the spring constant to be switched in a plurality of steps owing to the design of the rubber member 28, for example, without involving an increase in the number of constituent components.

In the stroke simulator 10, the coil spring 26 and the rubber member 28 are disposed in series such that the rubber member 28 is located forward of the coil spring 26. This configuration enables the spring constant of the stroke simulator 10 to be small in a region in which the operation force applied to the brake pedal 12 is small and enables the spring constant to be large in a region in which the operation force applied to the brake pedal 12 is large, as illustrated in FIGS. 5 and 6. It is thus possible to obtain a soft feeling in an initial operating stage of the brake pedal 12 and a hard feeling in a latter operating stage of the brake pedal 12. This ensures a favorable operation feeling.

In the feeling characteristics illustrated in FIG. 6 (i.e., the relationship between the stroke of the brake pedal 12 and the brake operation force applied to the brake pedal 12), "P" (the brake operation force by which the brake pedal 12 starts to move) can be made small by the design of the coil spring 26 and the design of the cap 32. The operation force P can be made small by making a set load of the coil spring 26 small or by making a sliding resistance between the cap 32 and the rod 14 small, for example. In this respect, the sliding resistance can be made small by applying oil to the cap 32 or by omitting a sealing member that is a constituent element of the cap 32, for example. In a case where the working fluid is not stored in the volume change chamber 24, the scaling member of the cap 32 is unnecessary. The cap itself may be omitted.

The inclination of the line M in the region A in FIG. 6, namely, the inverse (1/KA) of the spring constant KA, can be easily made large by decreasing the spring constant kl of the coil spring 26. The spring constant of the coil spring 26 is determined by the design of the coil spring 26 such as the diameter and the number of turns. For example, an increase in the diameter or the number of turns of the coil spring 26 or a decrease in the wire diameter of the coil spring 26 makes it possible to decrease the spring constant.

Figure 7:
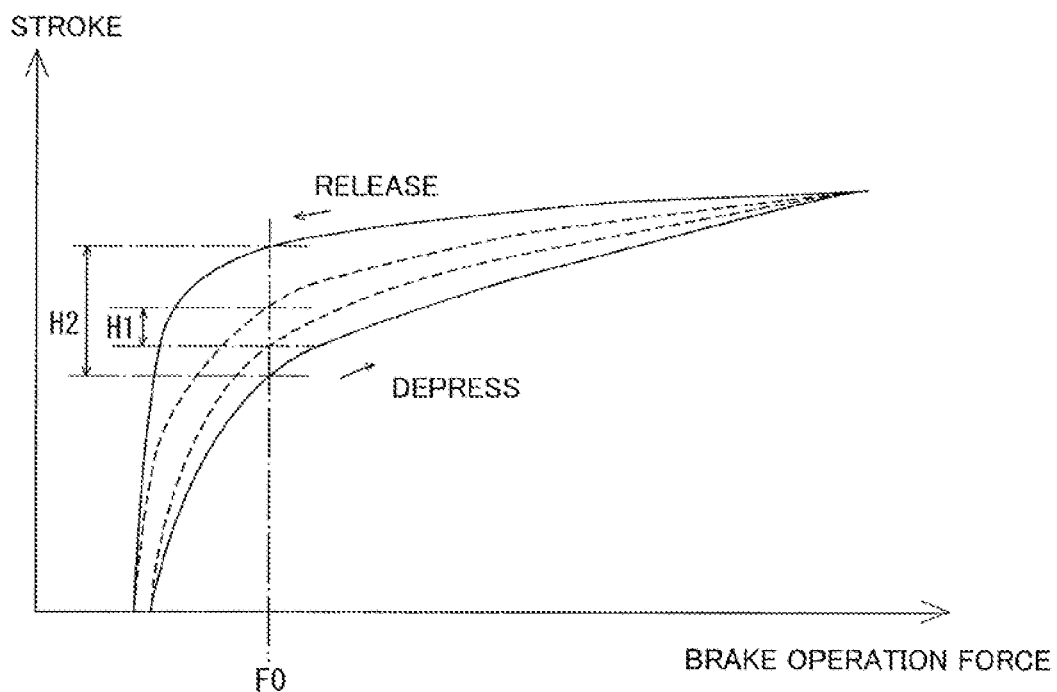
FIG. 7 is a graph conceptually illustrating the relationship between the stroke and the brake operation force in the stroke simulator.

In FIG. 7, the feeling characteristics in the stroke simulator 10 in a case where the brake operation force is decreased after having been increased are indicated by the dashed line, and the feeling characteristics in a stroke simulator in which two coil springs are disposed in series are indicated by the solid line. As illustrated in FIG. 7, the stroke simulator 10 includes the coil spring 26 and the rubber member 28 (or a rubber member 50 that will be described) disposed in series, whereby hysteresis H can be made small (H1<H2). By making the rubber member hard, namely, by increasing the spring constant of the rubber member, hysteresis of the rubber member can be made small. In other words, the coil spring 26 and the rubber member 28 are disposed in series, so that the stiffness of the rubber member 28 can be increased, resulting in a decrease in hysteresis.

In the meantime, it is not necessarily desirable that hysteresis be zero. It is known that a certain degree of magnitude of hysteresis contributes to a better operating feeling as felt by the driver. The rubber member 28 is typically designed such that the magnitude of hysteresis when the brake operation force is equal to F0 (FIG. 7) is close to a target value. In the present stroke simulator 10, the magnitude of hysteresis can be adjusted by suitably designing the rubber member 28. In this respect, easier adjustment of hysteresis is attained by the design of the rubber member 28 rather than the design of the coil spring.

Figure 8:
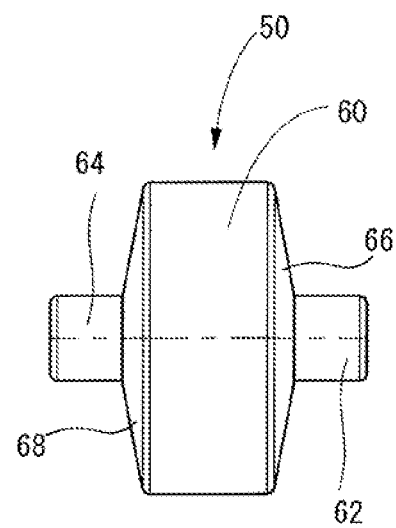
FIG. 8 is a front view of another rubber member applicable to the stroke simulator.

The rubber member may have a shape illustrated in FIG. 8. A rubber member 50 illustrated in FIG. 8 includes a main body 60, the protruding portions 62, 64, and inclined portions 66, 68 provided between the main body 60 and the corresponding protruding portions 62, 64. The stroke simulator including the rubber member having the inclined portions 66, 68 exhibit the feeling characteristics indicated by the dashed line N in FIG. 6, for instance. In the feeling characteristics indicated by the dashed line N, the change in the inclination is smaller, as compared with that in the feeling characteristics indicated by the line M.

The rubber member may have any suitable shape. For example, a cylindrical rubber member may be disposed in series with the coil spring. Also in this arrangement, the spring constant is made small in the initial operating stage and made large in the latter operating stage, and the operation force at the time of bottoming is easily increased, as compared with an arrangement in which two coil springs are disposed in series.

In the embodiment illustrated above, the stroke simulator includes the two elastic members. The stroke simulator may include three or more elastic members, and at least two of them may be the rubber members. The shapes of the movable member 21 and the housing 20 may be suitably designed and changed. It is to be understood that the present disclosure may be changed and modified based on the knowledge of those skilled in the art.

CLAIMABLE INVENTION (1) A stroke simulator operable by an operation of a brake operating member that is operated by a driver, including:
a housing:
a movable member held by the housing so as to be movable relative to the housing, the movable member being connected to the brake operating member;
a volume change chamber disposed forward of the movable member in the housing; and
a plurality of elastic members disposed in the volume change chamber and capable of generating an elastic force in accordance with a movement of the movable member, at least one of the plurality of elastic members being a rubber-like member.

The rubber-like member is formed of a material that includes synthetic rubber, natural rubber or the like. The rubber-like member has elastic characteristics such as rubber. The rubber-like member may be referred to as an elastomer.

The volume change chamber may or may not store the working fluid.

(2) The stroke simulator according to the form (1), wherein at least one of the plurality of elastic members is a coil spring.

(3) The stroke simulator according to the form (2), wherein the at least one rubber-like member is located forward of the at least one coil spring.

(4) The stroke simulator according to the form (2) or (3),
wherein the plurality of elastic members are two elastic members,
wherein the two elastic members include the rubber-like member and the coil spring, and
wherein the rubber-like member and the coil spring are disposed in series such that the rubber-like member is located forward of the coil spring.

(5) The stroke simulator according to the form (4),
wherein, when an amount of the movement of the movable member is small, the coil spring is mainly elastically deformed, and
wherein, when the amount of the movement of the movable member is large, the rubber-like member is mainly elastically deformed.

The stiffness of the rubber-like member is in general larger than the spring constant of the coil spring. The rubber-like member having larger stiffness is easily produced by suitably designing the rubber-like member. In a case where the stroke simulator is designed such that the rubber-like member is mainly elastically deformed when the amount of the movement of the movable member is large, favorable feeling characteristics can be obtained and the operation force of the brake operating member at the time of bottoming can be easily increased.

(6) The stroke simulator according to any one of the forms (2) through (5), wherein a spring constant of the rubber-like member is larger than a spring constant of the coil spring.

The spring constant (N/mm) of the rubber-like member may be referred to as stiffness.

(7) The stroke simulator according to any one of the forms (1) through (6), wherein the rubber-like member includes a main body and a front-side protruding portion provided on a front end face of the main body, the rubber-like member being supported at the front-side protruding portion thereof by the housing.

When the movable member is located at the retracted end position thereof, the front end face of the main body of the rubber-like member is spaced apart from the housing. In this state, a portion of the front end face of the main body spaced apart from the housing is likely to be elastically deformed. On the other hand, the front-side protruding portion is less likely to be elastically deformed because the front-side protruding portion is opposed to and supported by the housing. The rubber-like member may include the protruding portion formed on the rear end face of the main body, namely, the rubber-like member may include a rear-side protruding portion.

(8) The stroke simulator according to the form (7), wherein the main body is spaced apart from the housing when the movable member is located at a retracted end position thereof.

When the amount of the movement of the movable member becomes large, the front end face of the main body comes into contact with the housing. In the state in which the front end face of the main body is in contact with the housing, the rubber-like member is less likely to be elastically deformed.

(9) The stroke simulator according to the form (7) or (8), wherein the rubber-like member includes an inclined portion provided between the main body and the front-side protruding portion.

(10) The stroke simulator according to the form (7) or (8), wherein the rubber-like member includes a rounded portion provided at a connection between the main body portion and the front-side protruding portion.

(11) The stroke simulator according to any one of the forms (1) through (10), wherein the movable member includes a large-diameter portion and a small-diameter portion and is shaped such that one of a front end face of the small-diameter portion and a front end face of the large-diameter portion protrudes more forward than the other of the front end face of the small-diameter portion and the front end face of the large-diameter portion.

For example, one of the large-diameter portion and the small-diameter portion is configured to come into contact with the rubber-like member before the other of the two portions, whereby the spring constant of the stroke simulator can be switched in a plurality of steps.

(12) The stroke simulator according to the form (11), wherein the rubber-like member includes a main body and a rear-side protruding portion provided on a rear end face of the main body, and
wherein the small-diameter portion is opposed to the ear-side protruding portion of the rubber-like member, and the large-diameter portion is opposed to the main body of the rubber-like member via a plate-like member.

(13) The stroke simulator according to any one of the forms (1) through (12), wherein the rubber-like member has a stepped shape including a main body and at least one protruding portion.

(14) A brake operating device, including: a brake operating member that is operated by a driver; and a stroke simulator according to any one of the forms (1) through (13) operable by an operation of the brake operating member.

What is claimed is:
1. A brake operating device, comprising:
a brake operating member that is operated by a driver; and
a stroke simulator operable by an operation of the brake operating member,
wherein the stroke simulator includes:
a housing;
a movable member held by the housing so as to be movable relative to the housing, the movable member being connected to the brake operating member;
a volume change chamber disposed forward of the movable member in the housing; and
a plurality of elastic members disposed in the volume change chamber and capable of generating an elastic force in accordance with a movement of the movable member, at least one of the plurality of elastic members being an elastomer,
wherein the plurality of elastic members are two elastic members,
wherein the two elastic members include the elastomer and a coil spring,
wherein the elastomer and the coil spring are disposed in series such that the elastomer is located forward of the coil spring in a depression direction of the brake operating member in which the brake operating member is depressed,
wherein, when the brake operating member is depressed, the movable member is advanced in the depression direction of the brake operating member, causing an elastic deformation of at least one of the two elastic members to generate the elastic force,
wherein the elastomer includes a main body and a front-side protruding portion provided on a front end face of the main body, the front-side protruding portion being supported by a rear end face of a bottom portion of the housing,
wherein, when the brake operating member is located at a retracted end position thereof, a space is present between the front end face of the main body of the elastomer and the rear end face of the bottom portion of the housing, and
wherein the front end face of the main body of the elastomer comes into contact with the rear end face of the bottom portion of the housing when an operation force applied to the brake operating member becomes larger than a set value.

2. The brake operating device according to claim 1, wherein a spring constant of the elastomer is larger than a spring constant of the coil spring.

3. The brake operating device according to claim 1, wherein the elastomer includes an inclined portion provided between the main body and the front-side protruding portion.

4. A brake operating device, comprising:
a brake operating member that is operated by a driver; and
a stroke simulator operable by an operation of the brake operating member,
wherein the stroke simulator includes:
a housing;
a movable member held by the housing so as to be movable relative to the housing, the movable member being connected to the brake operating member;
a volume change chamber disposed forward of the movable member in the housing; and
a plurality of elastic members disposed in the volume change chamber and capable of generating an elastic force in accordance with a movement of the movable member, at least one of the plurality of elastic members being an elastomer,
wherein the plurality of elastic members are two elastic members,
wherein the two elastic members include the elastomer and a coil spring,
wherein the elastomer and the coil spring are disposed in series such that the elastomer is located forward of the coil spring in a depression direction of the brake operating member in which the brake operating members is depressed,
wherein, when the brake operating member is depressed, the movable member is advanced in the depression direction of the brake operating member, causing an elastic deformation of at least one of the two elastic members to generate the elastic force,
wherein the movable member includes a large-diameter portion and a small-diameter portion and is shaped such that a front end face of the small-diameter portion protrudes more forward than a front end face of the large-diameter portion, wherein the elastomer includes a main body and a rear-side protruding portion provided on a rear end face of the main body, wherein the small-diameter portion of the movable member is opposed to the rear-side protruding portion of the elastomer, and the large-diameter portion of the movable member is opposed to the main body of the elastomer via a plate member, and wherein, when the brake operating member is located at a retracted end position thereof, a space between the front end face of the small-diameter portion of the movable member and a rear end face of the rear-side protruding portion of the elastomer is smaller than a space between the front end face of the large-diameter portion of the movable member and a rear end face of the plate member.

* * * * *